United States Patent [19]

Blackburn

[11] Patent Number: 5,522,437
[45] Date of Patent: Jun. 4, 1996

[54] DRIP TREE OIL RECOVERY SYSTEM

[76] Inventor: Steven J. Blackburn, 1005 County Rd. #254, P.O. Box 1573, Lyman, Wyo. 82937

[21] Appl. No.: 497,850

[22] Filed: Jul. 3, 1995

[51] Int. Cl.[6] ................. B65B 1/04; B65B 3/00
[52] U.S. Cl. ............... 141/106; 141/364; 211/74
[58] Field of Search ............ 141/106, 86–88, 141/346, 364, 367, 383, 386; 211/74

[56] References Cited

U.S. PATENT DOCUMENTS

| | | | |
|---|---|---|---|
| 637,963 | 11/1899 | Howard | 141/106 |
| 2,071,944 | 2/1937 | Hoffman | 141/106 |
| 2,728,488 | 12/1955 | Hankins | 141/106 |
| 2,781,065 | 2/1957 | Hofacer | 141/106 |
| 4,632,268 | 12/1986 | Melzi et al. | 220/1 C |
| 4,673,081 | 6/1987 | Habig et al. | 206/223 |
| 5,168,959 | 12/1992 | Davis | 184/1.5 |
| 5,222,534 | 6/1993 | Wilkinson, Jr. | 141/88 |

*Primary Examiner*—Henry J. Recla
*Assistant Examiner*—Steven O. Douglas
*Attorney, Agent, or Firm*—David L. Baker; Rhodes & Ascolillo

[57] ABSTRACT

A new oil recovery system comprising a collection container, a cover that is removably affixed to the container and an elongated tubular member that is connected to the cover and contains a number of collection ports adapted to receive new oil containers. The collection ports are in two styles, one for center spout containers and one for offset spout containers. The collection ports are located on only one side of the tube thereby allowing the invention to be used and stored in close proximity to a wall or other vertical surface.

6 Claims, 2 Drawing Sheets

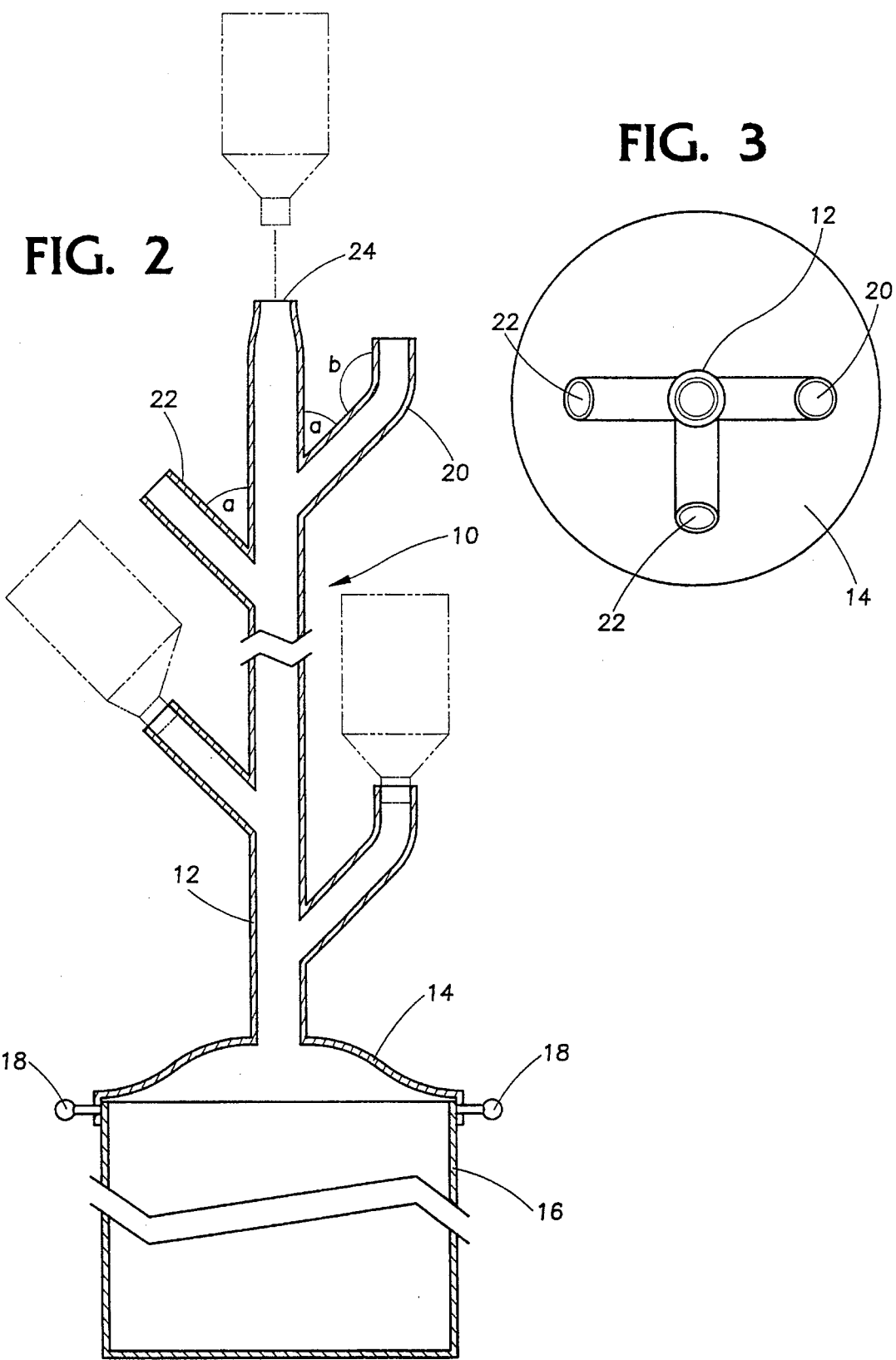

DRIP TREE OIL RECOVERY SYSTEM

BACKGROUND OF THE INVENTION

1. Field of the Invention

This invention relates generally to the recovery of new and unused oil from small containers and in particular to a standing apparatus for the recovery of oil from multiple containers simultaneously.

2. Description of the Prior Art

The most common manner of sale for retail and wholesale motor oil today is by the quart or liter. The product is supplied in plastic containers containing measured amounts allowing consumers to follow vehicle specifications without the need for special measuring equipment. The typical vehicle requires four or five quarts of motor oil to refill the oil reservoir when the oil is drained and changed. With each container there remains a small quantity of residual oil that clings to the walls of the container and which will, after a period of time drain from an inverted container. The problem is the time required to drain the residual oil is not cost effective in terms of the quantity recovered per individual quart. However, in terms of the gross quantity of oil recovered in a shop or garage where a large number of oil changes take place every day the recovery is worthwhile. The recovery is also worthwhile in terms of oil diverted from land fills. Although a teaspoon of oil in a land fill is insignificant, that quantity of oil times hundreds of containers deposited daily is significant. In the case of plastic recycling, the oil within a container will sometimes rule out a container for remanufacture.

There have been some devices to aid and assist in the effort for oil recovery, however these devices generally are limited to the recovery of oil from a single oil change of five to six quarts and are otherwise large and inconvenient to use in a shop or garage. Currently there is no known device that will accept a quantity of quart or liter containers and recover residual oil over a period of time and that is also adapted to receive containers with center spouts or offset spouts.

Examples of prior art devices are shown in the following U.S. Pat. Nos.: U.S. Pat. No. 4,632,268 issued Dec. 30, 1986 to Melzi et al. for a disposable oil drain pan and container combination which collects and stores, for removal, used oil; U.S. Pat. No. 4,673,081 issued Jun. 16, 1987 to Habig et al. who show an alternative type of waste oil drain collector and storage container kit; U.S. Pat. No. 5,168,959 issued Dec. 8, 1992 to Davis for an oil receiving container which is comprised of a box-like container with apertures in the top for receiving the spout of a new oil container, where the residue drops into the container, is stored and then evacuated for use as needed, and U.S. Pat. No. 5,222,534 issued Jun. 29, 1993 to Wilkinson, Jr. for a container restraint that provides a means for filling containers such as the quart or liter oil container in a non manufacturing situation.

The prior art taken alone or in combination fails to anticipate the invention disclosed and claimed herein.

SUMMARY OF THE INVENTION

The invention is characterized by an elongated conduit that is connected on one end to a cover plate that is adapted to attach to a collecting container. The conduit stands erect when the cover is attached to a collecting container. Cooperatively affixed to the conduit are a plurality of collecting ports which are of a size and shape to receive the quart and liter containers that are used most often for carrying motor oil and other lubricants. Where the containers are formed in two general shapes, the center spout and the offset spout, the ports are designed in two different shapes to accommodate and facilitate the efficient draining of the two styles of containers. The collecting ports are spaced up and down the conduit on approximately fifty percent of the surface of the conduit. The remaining fifty percent of the conduit is without appendage thereby allowing the invention to be placed proximate a wall or other vertical surface without interference from the collecting ports or the containers that would be associated with them.

It is therefore an object of the invention to provide a new and improved new oil recovery system.

It is another object of the invention to provide a new and improved new oil recover system that is adapted to accept both containers with center neck spouts and containers with offset neck spouts.

It is a further object of the invention to provide a new and improved new oil recovery system that is simple in construction and contains no moving parts.

It is still another object of the invention to provide a new and improved new oil recovery system that is low in cost.

It is still a further object of the invention to provide a new and improved new oil recovery system that is safe to the environment.

It is another object of the invention to provide a new and improved new oil recovery system that will service more containers in less floor space than any hitherto disclosed similar device.

These, together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

FIG. 2 is a view of the invention in cross section.

FIG. 3 is a top plan view of the invention.

DETAILED DESCRIPTION OF A PREFERRED EMBODIMENT

Figure 1:
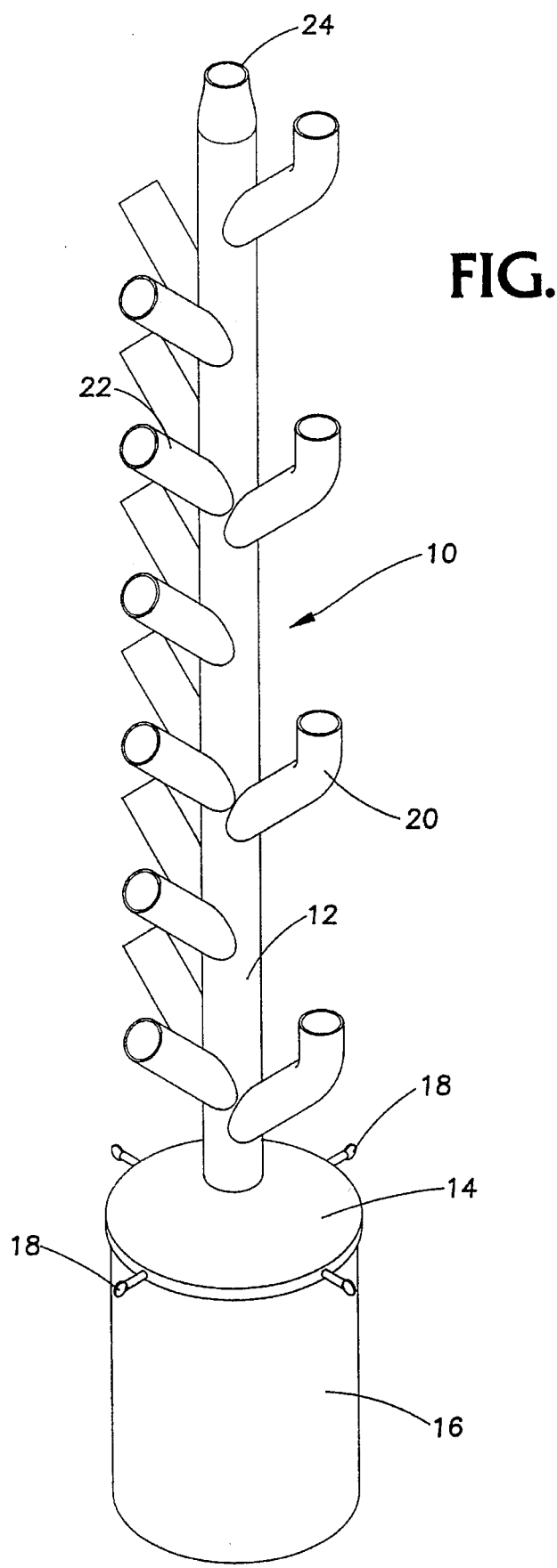
FIG. 1 is a perspective view of the invention.

Referring now to FIGS. 1, 2 and 3, the invention is shown generally at 10 and consists of a central vertical conduit 12 that is connected to an adaptive cover 14 which is removably attached to a collection container 16. The cover 14 could be attached to the container by thumb screws 18 for example. Collecting ports 20 and 22 are operatively connected to the central conduit 12. An additional collecting port 24 is located at the distal end of the central conduit 12.

The collecting system may be formed from metal or plastic and the members are connected by the appropriate means for the material used. The central conduit 12 is optimally two inches in diameter with collecting ports one and one-half inches in diameter set at an angle "a" of forty-five degrees to the central conduit 12 with collectors 22 four inches in length spaced six inches apart and collectors 20 including a second angle "b" of forty-five degrees to the primary axis of the initial portion of the collecting port and spaced eight inches apart.

FIG. 2 shows the containers installed in the collecting ports, both the center spout and the off set spout.

FIG. 3 is a top plan view of the invention and shows the relative location of the collecting ports 20,22 around the central conduit. Approximately fifty percent of the surface of the central conduit 12 is free of any collection ports. The purpose of this is to allow the invention to be placed in close proximity to a wall or other vertical surface without interference from the containers or the collecting ports It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A new oil recovery system comprising: a collection container means; a cover means adapted to be removably attached to the collection container means; a central conduit extending from and operatively connected to the cover means; a plurality of collection port means, including apertures adapted for receiving oil dispensing containers, extending from and operatively connected to the central conduit, including a first set of collection port means extending from the central conduit at an angle of forty-five degrees from the primary axis of the central conduit and a second set of collection port means having a first portion extending from the central conduit at a first angle of forty five degrees from the primary axis of the central conduit and a second portion extending at a second angle of forty five degrees from the primary axis of the first portion of the second set of collection port means and spaced distally from said first portion whereby collection port for the second set of collection port means are defined as being parallel to the primary axis of the central conduit means, whereby the first and second sets of collection port means are arranged to lie within the confines of the cover means so as to allow the system to be stored in close proximity to a vertical surface.

2. A new oil recovery system according to claim 1 wherein: the first and second collection port means are connected to the central conduit in an area representing substantially half the surface area of the conduit, leaving substantially half the surface area of the conduit free from collection port means.

3. A new oil recovery system according to claim 2 wherein: the distal end of the central conduit forms a collection port.

4. A new oil recovery system according to claim 3 wherein: the cover is secured to the collection container by means of thumb screws.

5. A new oil recovery system according to claim 4 wherein: the system is formed of metallic members.

6. A new oil recovery system according to claim 4 wherein: the system is formed of polymeric members.

\* \* \* \* \*